United States Patent [19]

Rische et al.

[11] Patent Number: 4,984,542

[45] Date of Patent: Jan. 15, 1991

[54] THERMAL THROTTLE ACTUATOR

[75] Inventors: Kenneth L. Rische, Canton; Roger D. Affeldt, Davisburg; Edward A. Urbanek, Jr., Southgate, all of Mich.

[73] Assignee: McGuane Industries, Auburn Hills, Mich.

[21] Appl. No.: 398,157

[22] Filed: Aug. 24, 1989

[51] Int. Cl.[5] .............................................. F02D 9/02
[52] U.S. Cl. .................. 123/179 G; 123/339; 261/39.1; 261/65
[58] Field of Search .............. 123/179 G, 179 A, 339, 123/180 T; 261/65, 39.1, 39.4

[56] References Cited

U.S. PATENT DOCUMENTS

| | | | |
|---|---|---|---|
| 2,868,185 | 1/1959 | Bellicardi | 123/180 T |
| 3,695,591 | 10/1972 | Caisley | 123/179 G |
| 4,096,212 | 6/1978 | Rogerson et al. | 123/179 G |
| 4,099,506 | 7/1978 | Kolb | 123/339 |
| 4,222,236 | 9/1980 | Hegedus et al. | 123/179 G |
| 4,311,653 | 1/1982 | Kushida | 261/65 |
| 4,630,578 | 12/1986 | Nusser et al. | 123/179 G |

*Primary Examiner*—Andrew M. Dolinar
*Attorney, Agent, or Firm*—Barnes, Kisselle, Raisch, Choate, Whittemore & Hulbert

[57] ABSTRACT

A thermal throttle actuator adapted to be mounted in an opening of a throttle body of an internal combustion engine wherein the fuel system is electronically controlled. The thermal throttle actuator comprises a housing in which a plunger is mounted for reciprocating movement and is adapted to contact a spring loaded throttle plate in the throttle body. The plunger is yieldingly urged toward the throttle plate by a bias spring. A shape memory alloy in the shape of a helical spring is provided to produce a force on the plunger in a direction opposite to that of the bias spring when the shape memory alloy is heated to a temperature above a predetermined temperature. When the temperature is below the predetermined temperature, the shape memory alloy spring is readily deformable, the bias spring functions to provide a force on the throttle plate which maintains the throttle plate in an open position to enhance performance during cold starting of the engine.

7 Claims, 2 Drawing Sheets

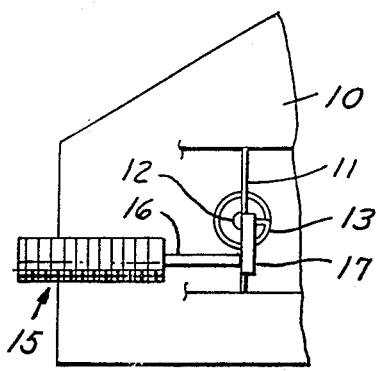
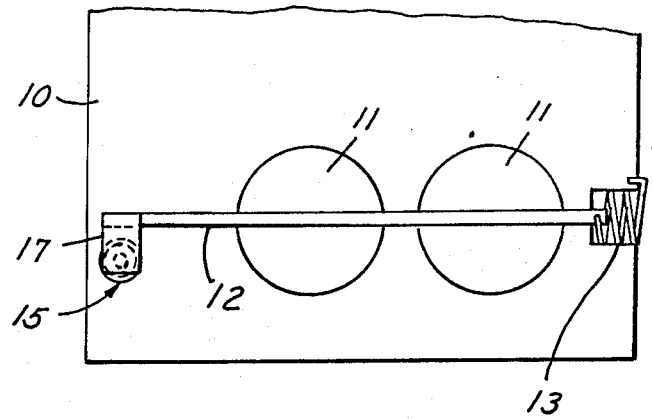
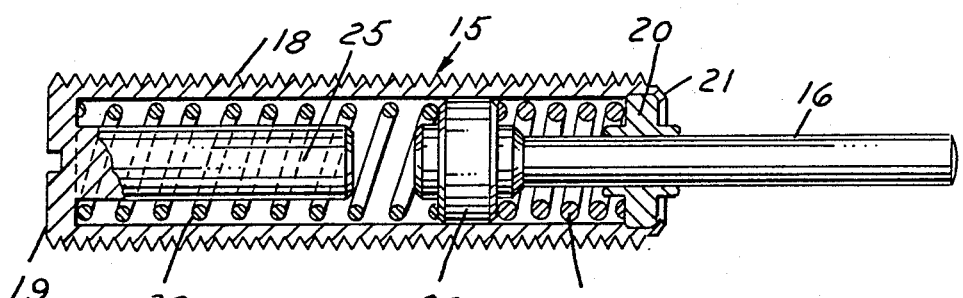
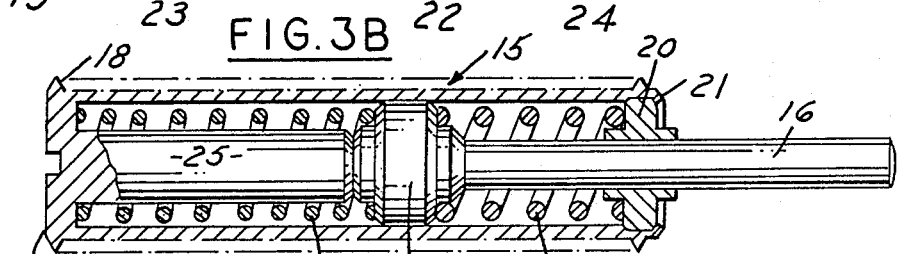
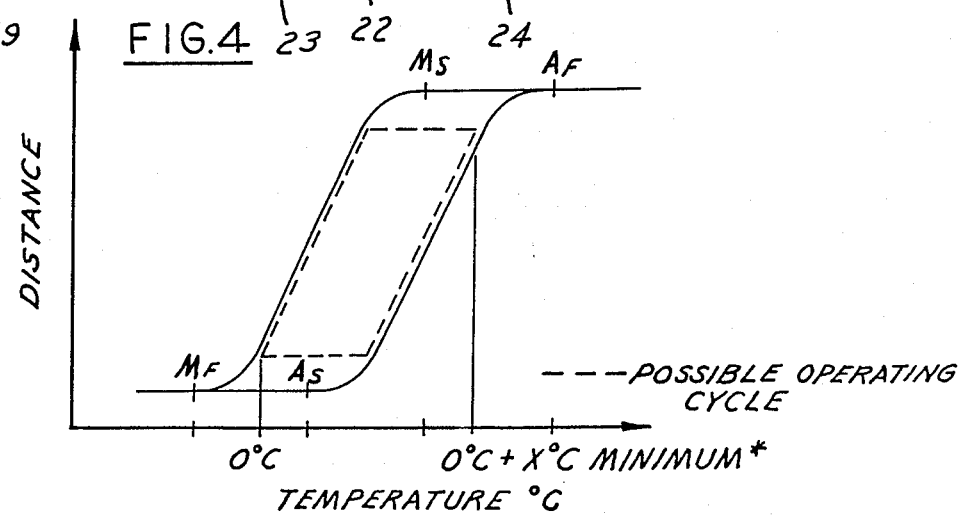

COLD - 0°C

COLD

HOT

THERMAL THROTTLE ACTUATOR

This invention relates to thermal actuators for the throttle plate of a throttle body utilized in connection with the internal combustion engines wherein the field system is controlled electronically.

BACKGROUND AND SUMMARY OF THE INVENTION

In internal combustion engines, the fuel systems have been replaced most recently by electronically controlled fuel injection systems. Accordingly the conventional carburetor with a choke to enhance performance during cold starting is eliminated. It has been found that in large engines, such as truck engines utilizing a throttle body fuel injection system, the engine requires long cranking start times at cold temperatures, and occasional restarts due to stalling. Accordingly, it was determined that this could be corrected by opening the throttle plates called cracking, approximately 0.1 inch. However, there is a need for a device that would function as the engine temperature increases to eliminate the opening of the throttle plates at idle and thereby avoid rough idling as well as minimize the undesired fuel emissions.

In consideration of this problem, various solutions were considered. Among these were a direct actuation of the throttle plate by metal coil but this was rejected because of the large size required to develop the loads that were needed. Bi-metal snap-action discs were investigated but, they were found to be limited in force, had a limited stroke and required a stack of a plurality of discs which would result in a costly solution. Wax pellet actuators were considered but it was found that no wax was available that could provide a transition point at cold temperatures such as 32° F. It was also judged that such a device would be complex and would have a large variation in the actuation temperature tolerance. Vacuum actuators were also considered which would function to extend when the engine is off and retract when engine starts. However this was found to be an expensive and bulky solution.

Among the objectives of the present invention were to provide a thermal throttle actuator that would function to maintain the throttle plates open the desired amount while at cold temperature, which would function at proper temperature tolerances to eliminate the cracking of the throttle plates at warm idle; which had minimal hysterisis; which was compact; which could readily be adapted to a throttle body; and which was relatively low in cost.

In accordance with the invention, the thermal throttle actuator is adapted to be mounted in the opening of a throttle body of an internal combustion engine wherein the fuel system is electronically controlled. The thermal throttle actuator comprises a housing in which a plunger is mounted for reciprocating movement and is adapted to contact a spring loaded throttle plate in the throttle body. The plunger is yieldingly urged toward the throttle plate by a bias spring. A shape memory alloy in the shape of a helical spring is provided to produce a force on the plunger in a direction opposite to that of the bias spring when the shape memory alloy is heated to a temperature above a predetermined temperature. When the temperature is below the predetermined temperature, the shape memory alloy spring is readily deformable and the bias spring functions to provide a force on the throttle plate which maintains the throttle plate in open position to enhance performance during cold starting of the engine.

DESCRIPTION OF THE DRAWINGS

FIG. 1 is a schematic view of a throttle body of the fuel injection system embodying the invention.

FIG. 2 is a side elevational view taken along the line 2—2 in FIG. 1.

FIGS. 3A and 3B are longitudinal sectional views through the thermal throttle actuator.

FIG. 4 is a curve of the hysterisis of the actuator.

DESCRIPTION

Figure 5:
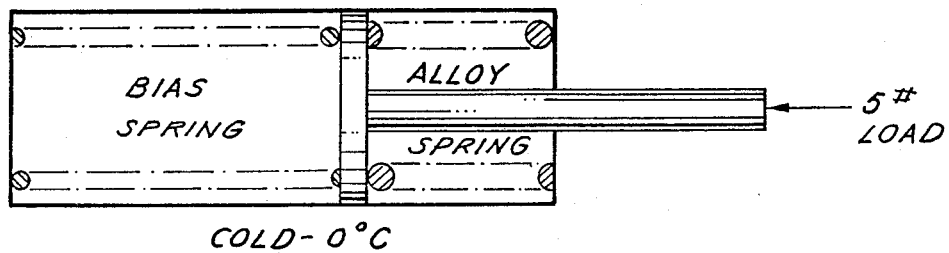
FIGS. 5 and 6 are schematic of the positions of the actuator at a cold temperature.

In fuel injection systems which are electronically controlled and includes a throttle body with throttle plates controlling the flow of fuel, it has been found that at cold temperatures, it is desirable to have the throttle plates open slightly. It is also desirable at warmer temperatures to have the throttle plates return to normal operating position in order to avoid rough idling and excessive fuel emissions.

Referring to FIGS. 1 and 2, which are schematic views of a throttle body embodying the invention, the throttle body 10 includes throttle plates 11 mounted on a rotatable shaft 12. A spring 13 yielding, urges the throttle plates to a closed throttle position. In accordance with the invention a thermal throttle actuator 15 is threaded into the throttle body 10 and has a plunger 16 yielding urging a tab 17 on the shaft 12 in a direction opposing the action of helical spring 13.

As shown in FIG. 3, the thermal throttle actuator 15 comprises a cylindrical housing 18 having a closed end 19 at one end and a bushing 20 at the other end which is held in place by crimping a portion of the housing 18, as at 21. The stem 16 has an integral enlarged portion 22. A helical bias spring 23 is interposed between the end wall 19 and the enlarged portion 22. A shape memory alloy in the form of a helical spring 24 is interposed between the enlarged portion 22 and the bushing 20.

It has been found that by providing such an arrangement in the throttle body wherein the bias spring 23 functions in the direction opposite to that of the torsion spring 13 and the shape memory spring 24 has the characteristics, as presently described, to provide desired control of the throttle plates is achieved.

The shape memory alloy is of the well known nickel-titanium type that functions upon the phenomenon that it is mechanically deformable when it is below a specific temperature but will return to a predetermined shape when the temperature is raised above the specific temperature. Such alloys have been heretofore used for various devices, such as fog lamp actuators for automobiles, air vent springs for air conditioners and coffee makers. The alloys of this type where a result of the work at the Naval Ordnance Laboratory as reported in the reference of W. J. Buehler, J. V. Gilfrich and R. C. Wiley, J. APPL. PHYS. Volume 34 1963, page 1475. One manufacturer of such alloys is Raychem Corporation of Menlo Park, Calif.

It has been found that by proper selection of the materials not only is the desired action obtained but a minimal hysterisis is achieved as shown in FIG. 4 is found.

The manner in which it the thermal throttle actuator functions to provide the desired control can be more readily understood by reference to FIGS. 5-8.

Utilizing a nickel-titanium memory material wound in a compression spring configuration and having a predetermined temperature below which is readily deformable, namely 32° F., and combined with a bias spring having a predetermined spring rate, it was found that the desired minimum travel was obtained.

Figure 6:
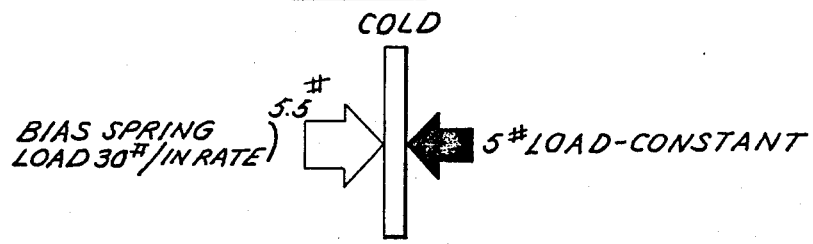
Figure 7:
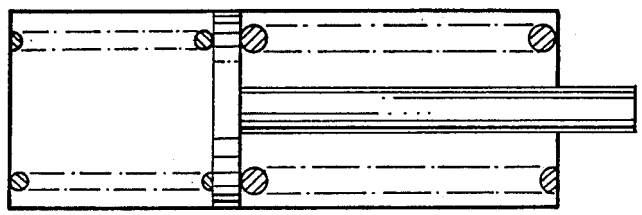
FIGS. 7 and 8 are schematic views of the position of the actuator at hot temperatures.
Figure 8:
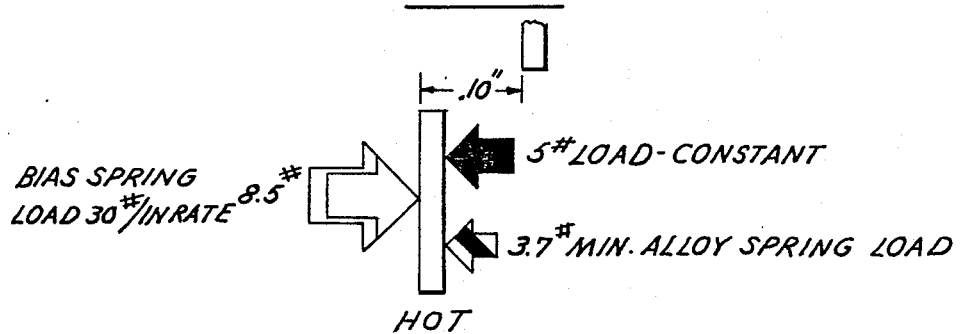

Referring specifically to FIGS. 5 and 6, when such a device is at a cold temperature less than 32° F. or 0° C., the bias spring 23 and the alloy spring 24 function such that the alloy spring 24 is merely mechanically deformed and has substantially less resistance. In this condition the bias spring 23 produces a force slightly greater than that of the force of the spring 13 of the throttle plates so that the throttle plates are moved or cracked the desired amount, namely, 0.10 inch. This facilitates the starting of the cold engine. As the engine heats up and the environment of the engine exceeds a temperature set point above 32° F. or 0° C., the alloy spring 24 functions to return to its predetermined configuration as shown in FIGS. 7 and 8, such that the force of the throttle return spring 13 combines with that of the alloy spring 24 to overcome the force of the bias spring 23 and eliminate the cracking of the throttle plates. The actuator 15 further includes a stop 25 extending axially from end 19 within bias spring 23 to limit the movement of plunger 16 under the action of the shape alloy spring 24 and the throttle return spring to control plunger return. This aids setting the curb idle position of the throttle throughout the life of the system.

It can thus be seen that there has been provided a thermal throttle actuator that would function to maintain the throttle plates open in the desired amount at cold temperature, which would function at proper temperature tolerances to eliminate the cracking of the throttle plates at warm idle; which had minimal hysterisis; which was compact; which could readily be adapted to a throttle body; and which was relatively low in cost.

We claim:

1. A thermal throttle actuator adapted to be mounted in an opening of a throttle body of an internal combustion engine wherein the fuel system is electronically controlled,
   said thermal throttle actuator comprising,
   a plunger mounted for reciprocating movement and adapted to contact a spring loaded throttle plate in the throttle body,
   a bias spring yielding urging said plunger toward the throttle plate,
   a shape memory alloy in the shape of a spring provided to produce a force on the plunger in a direction opposite to that of the bias spring when the shape memory alloy is heated to a temperature above a predetermined temperature, when the temperature is below the predetermined temperature, the bias spring functions to provide a force on the throttle plate which maintains the throttle plate in open position to facilitate cold starting of the engine.

2. The thermal throttle actuator set forth in claim 1 including a housing in which said bias spring and shape memory alloy spring are mounted.

3. The thermal throttle actuator set forth in claim 2 wherein said bias spring and shape memory spring are helical.

4. The thermal throttle actuator set forth in claim 3 wherein said shape memory alloy comprises a nickel-titanium alloy.

5. The thermal throttle actuator set forth in claim 4 including a throttle body having a throttle plate, a shaft on which said throttle plate is mounted, a spring biasing said plate to a closed condition said plunger interengaging said shaft.

6. The thermal throttle actuator set forth in any one of claims 1-5 including means for limiting the movement of said plunger under the action of the alloy spring and throttle return spring.

7. The thermal throttle actuator set forth in claim 6 wherein said means for limiting movement of said plunger comprises a stop extending axially through said bias spring.

* * * * *